United States Patent [19]

Summer

[11] 4,165,059
[45] Aug. 21, 1979

[54] FLOAT ASSEMBLY FOR A HELICOPTER OR THE LIKE

[75] Inventor: James R. Summer, Miami, Fla.

[73] Assignee: American Safety Equipment Corporation, Encino, Calif.

[21] Appl. No.: 858,699

[22] Filed: Dec. 8, 1977

Related U.S. Application Data

[63] Continuation of Ser. No. 681,799, Apr. 30, 1976, abandoned.

[51] Int. Cl.² ............................................. B60V 3/08
[52] U.S. Cl. ............................... 244/100 A; 114/292; 244/101; 244/105
[58] Field of Search ............... 9/11 A; 114/61, 292; 244/100 A, 101, 105, 108

[56] References Cited

U.S. PATENT DOCUMENTS

| | | | |
|---|---|---|---|
| 2,745,118 | 5/1956 | Potts et al. | 114/61 X |
| 3,154,270 | 10/1964 | Jensen | 244/101 |

FOREIGN PATENT DOCUMENTS

117119  7/1917  United Kingdom ............... 244/100 A

Primary Examiner—George E. A. Halvosa
Assistant Examiner—Sherman D. Basinger
Attorney, Agent, or Firm—Poms, Smith, Lande & Rose

[57] ABSTRACT

A float assembly for supporting a vehicle having three cylindrical float tubes tangentially secured together by a suitable adhesive with two of the float tubes being positioned so that the centerlines thereof are in a horizontal plane. The three float tubes are secured together to form a pyramid whereby the intersections thereof form a Y-shaped cross-sectional configuration so that the centers of the cylindrical float tubes form a triangle which is or approaches an equilateral triangle. Girths are secured to the float assembly in the horizontal plane and are suitably bolted to skids which are attached to the vehicle. The forward and aft ends of each of the cylindrical float tubes are frustoconical shaped cones which are inclined upwardly to increase the maneuverability of the vehicle and prevent pitch poling. The outboard and top float tubes have bulkheads to provide several sections to enable the float tubes to provide flotation in the event that one of the sections is deflated.

15 Claims, 6 Drawing Figures

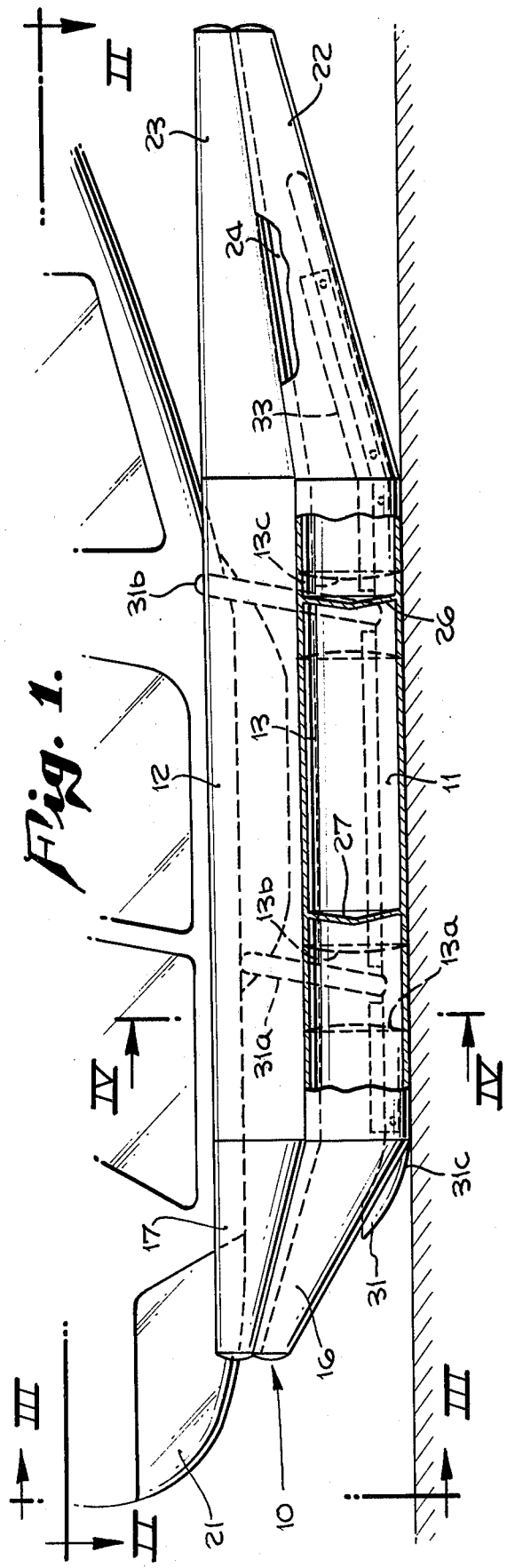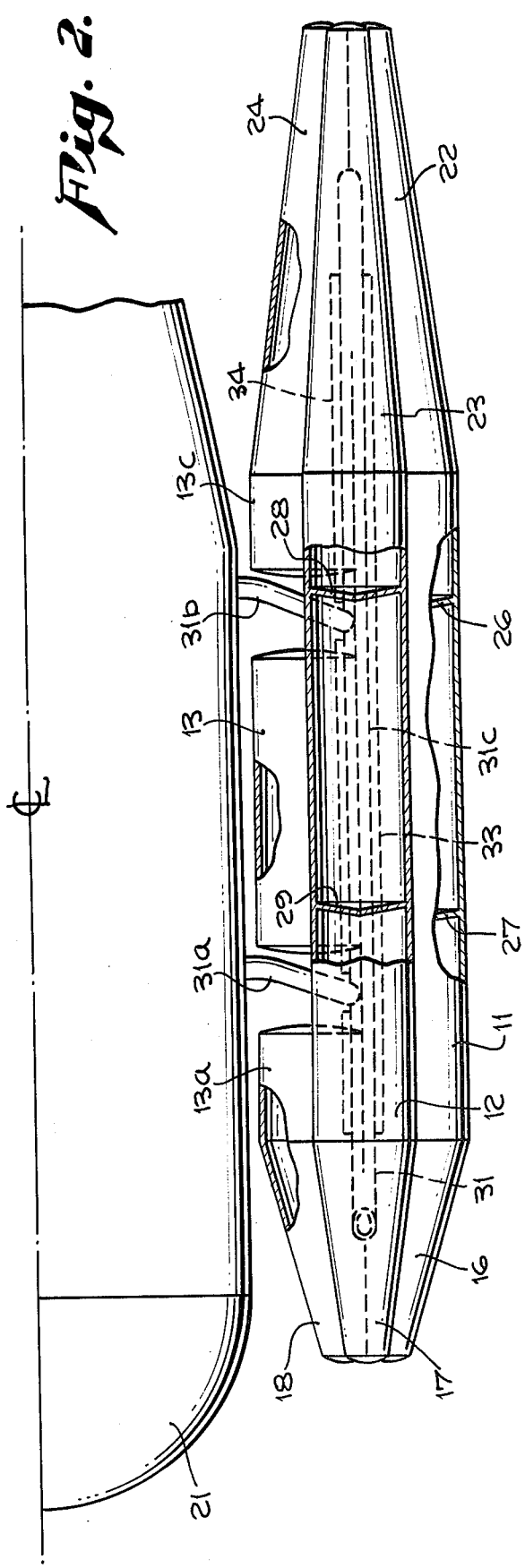

FLOAT ASSEMBLY FOR A HELICOPTER OR THE LIKE

This is a continuation of application Ser. No. 681,799 filed Apr. 30, 1976 and which is now abandoned.

BACKGROUND OF THE INVENTION

The present invention relates to a float assembly and more particularly to an assembly having three float tubes for supporting a vehicle.

Various prior art float assemblies have been used to support vehicles such as a helicopter on a water surface. These assemblies include cylindrical shaped float tubes which are, typically, inflatable by a suitable reservoir of compressed air which may be controlled by the helicopter pilot.

Early float assemblies included one float tube attached to each skid of the helicopter. These floats were used for providing sufficient buoyancy to a helicopter to enable the occupants to be evacuated in the event the helicopter had to make an emergency landing on a water surface. They did not, however, provide sufficient buoyancy to permit the helicopter to be saved.

The float assembly art progressed to the point where the float device was located beneath the helicopter skid to provide clearance between the fuselage and the water surface. These floats were capable of providing sufficient flotation to the helicopter to enable the occupants as well as the helicopter to be saved in the event of an emergency landing on a water surface. These float assemblies included float tubes which were typically cigar shaped with hemispherical ends for plowing through the water. This plowing limited maneuverability of the helicopter in the water. In addition, it lacked aerodynamic quality and suffered from damage due to the helicopter continually landing on the float.

The float assemblies were subsequently moved to the upper surface of the skid to thereby reduce the possibility of damage to the float tubes on ground contact. To provide a greater fuselage to water surface clearance, these float assemblies were designed having two cylindrical float tubes joined together so their centerlines were in a horizontal plane and the two float tubes were urged together so that the surfaces intersected along a vertical line which was equidistant from the respective centers of the two cylindrical float tubes. These floats provided a conical planing type bow to reduce the plowing effect of earlier designed floats and to increase the maneuverability of the helicopter on water. The tail portions of the floats were made conical and sloped upwards towards the tail to provide clearance during low tail landings. These types of float assemblies provided maneuverability on the water and improved aerodynamic performance. They still, however, did not provide adequate fuselage to water clearance at all landing conditions and tended to permit the tail rotor to come dangerously close to the water under light or empty load conditions.

SUMMARY OF THE INVENTION

The present invention provides a float assembly which provides maximum fuselage to water surface clearance for a helicopter. To attain this, the invention provides a float assembly having three float tubes which are tangentially secured together by a suitable adhesive with two float tubes being positioned so that the centerlines thereof are in a horizontal plane. The three float tubes are secured to form a pyramid whereby the intersections form a Y-shaped cross-sectional configuration with the tubes being cylindrical in cross-section except for the portions which form the Y-shaped cross-sectional configuration so that the centers of the cylindrical float tubes form a triangle which is or approaches an equilateral triangle.

Girths are secured to the two float tubes which are in the horizontal plane and are suitably bolted to the associated skid which is attached to the helicopter vehicle. The forward and aft ends of each of the cylindrical float tubes are frustoconical-shaped cones. The forward frustoconical-shaped sections are inclined upwardly at an angle in the order of 28° to provide a planing bow for water maneuverability. The frustoconical-shaped members secured to the aft ends of each of the cylindrical float tubes are inclined upwardly at an angle in the order of 14° to permit tail low landing attitudes and reduce the possibility of pitch poling.

The joining of the float tubes at tangential points to form an equilateral triangle between the centerlines of the three float tubes eliminates or reduces the separating forces experienced in dual tube float assemblies to thereby provide weight, bulk, and cost savings. This construction also eliminates or reduces the possibility of field failure due to the high separating forces inherent in the design of prior art dual tube float assemblies.

The triple tube design of the present invention permits the helicopter skids to be located beneath the intersection of the two lower tubes. This in turn locates the girthing so that the adhesive joint between the girth and the tubes is loaded in a more nearly true shear direction. It further lowers the float to thereby provide additional fuselage to water clearance.

This loading in the shear direction has substantial advantages over prior art single and dual tube float assemblies in that in these prior art devices, the float sits on the top of the skid causing the girthing to function so that the adhesive joint between the girth and the float is loaded entirely in a peel direction. This is an undesirable loading since adhesive joints develop their maximum strength when loaded in a shear direction.

The tube diameter of the triple tube design is smaller than that of a dual or single tube design. This permits the use of lighter weight fabric and/or use of the same weight fabric used in the prior art at reduced stress loading. This in turn increases the service life of the floats.

The outboard and top float tubes of the present invention have bulkheads to provide several sections to enable the floats to provide flotation in the event one of the sections is deflated. In a typical embodiment of the present invention, the float assembly is designed to provide a buoyancy of 160 percent of a 3,200 lb. helicopter having two skids. The two float assemblies, each associated with one of the two skids, has a minimum volume of 41.03 cubic feet which is equivalent to 2,560 lbs. of buoyancy. The outboard and upper tubes of each of the float assemblies contains two bulkheads to form three equal volumes per tube compartments of 4.88 cu. ft. each. If one of these compartments becomes damaged, the reduction in float buoyancy will be less than 304 lbs. and the remainder of the damaged float tube will continue to provide 2,256 lbs. of buoyancy or 141 percent of the minimum buoyancy required by the 3,200 lb helicopter.

Alternatively, the outboard and upper tube of each float assembly could be bulkheaded with a single bulkhead providing two compartments of 7.32 cu. ft. each. If one section of one float tube is damaged, the reduction in float buoyancy would be less than 457 lbs. and the remainder of the damaged float assembly contains 2,103 lbs. of buoyancy or 131 percent of the minimum buoyancy required by the 3,200 lb. helicopter.

Accordingly, an object of the present invention is to provide float assembly means to provide a maximum fuselage to water surface clearance.

Another object is to provide a float assembly having girth means which during a landing on water loads the girth to float attachment in a shear direction.

Yet another object is to provide a float assembly having frustoconical-shaped ends to provide a planing bow and to reduce pitch poling when used with a helicopter.

Still another object of the present invention is to provide a float assembly having a bulkhead means for float tubes of a triple tube float assembly to provide minimum reduction in total buoyancy if one of the sections is deflated.

Yet a further object is to provide a triple tube float assembly means for a helicopter having tube diameters which are relatively small to permit the use of lighter weight fabric or the same fabric used in prior art devices at reduced stress loading to thereby increase the service life of the float.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevational view, partly in cross-section, of an inflated float assembly with portions broken away.

FIG. 2 is a cross-sectional view of FIG. 1 taken along the plane of II—II and having portions broken away.

DESCRIPTION OF THE PREFERRED EMBODIMENT

Figure 3:
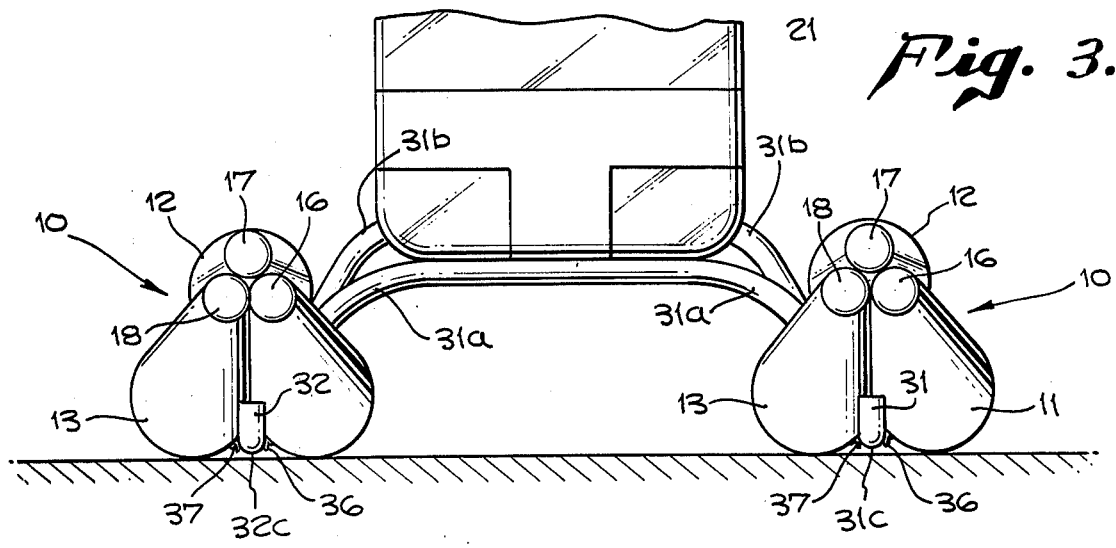
FIG. 3 is a view of FIG. 1 taken along the plane of III—III.
Figure 4:
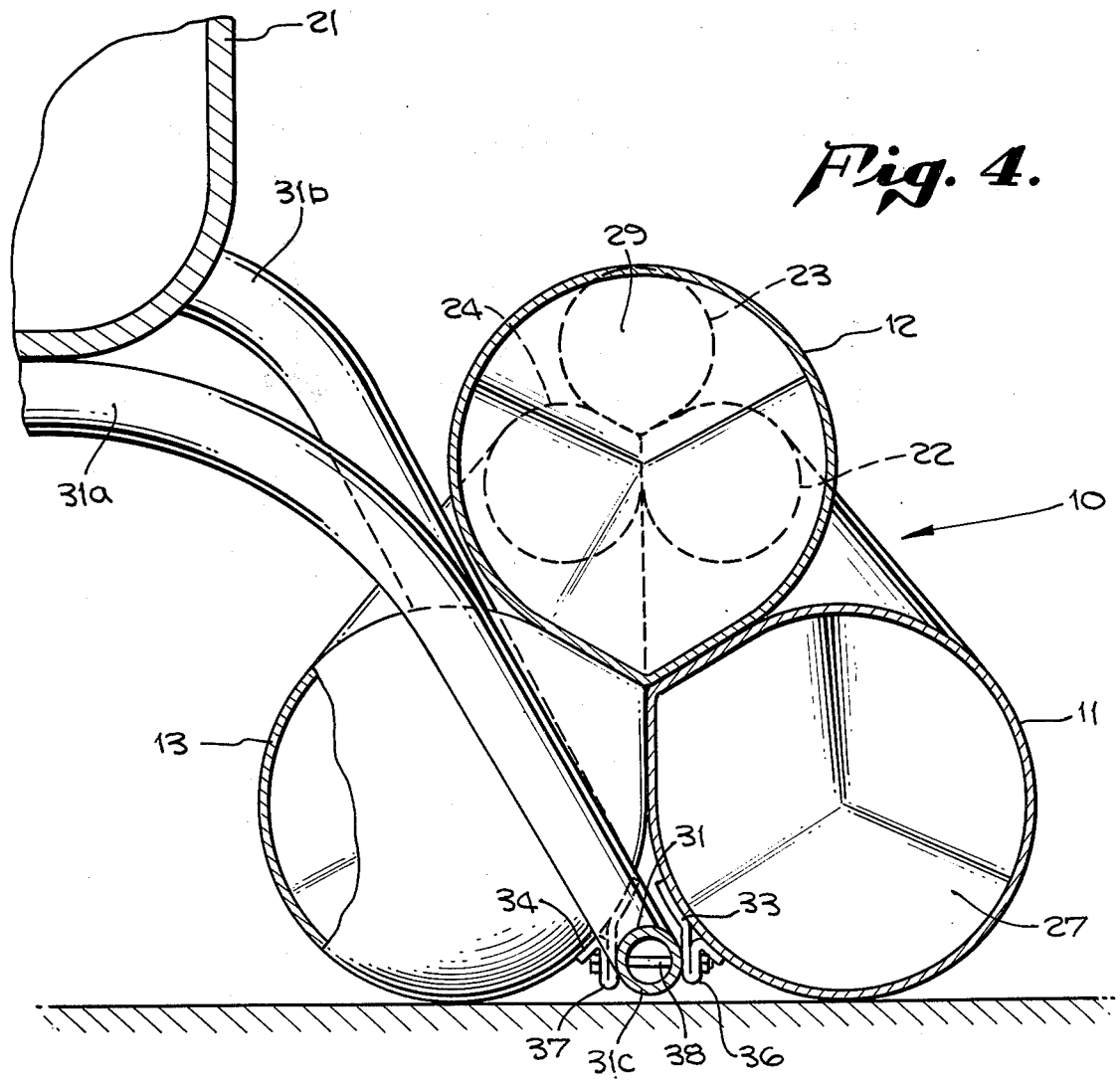
FIG. 4 is a cross-sectional view of FIG. 1 taken along the plane of IV—IV.

Referring to FIGS. 1, 2 and 3, there is shown the float assembly 10 of the present invention having three float tubes 11, 12 and 13. It is understood that two float assemblies 10 may be provided beneath the vehicle but for clarity and ease of understanding, only one float assembly 10 will be described in detail. As best shown in FIGS. 2, 3 and 4, the three float tubes are arranged in a pyramid and, as shown in FIG. 4, the planes of intersection form a Y-shaped cross-sectional configuration so that the centers of the float tubes form a triangle which is or approaches an equilateral triangle. The float tubes have cylindrical cross sections except for the portions which form the Y-shaped cross sectional configuration. The center lines of the three tubes 11, 12 and 13 are parallel and the center lines of the two lower tubes 11 and 13 are in a horizontal plane. The three float tubes are secured together along their length by any suitable securing means such as an adhesive means. In cross-section (FIG. 4), the intersection of the three tubes 11, 12 and 13 form a Y-shaped configuration.

Each of the floats has a frustoconical shaped section secured to the forward end thereof and inclined upwardly to provide a planing bow to increase the maneuverability of the vehicle. In the preferred embodiment, these frustoconical shaped sections are shown as 16, 17 and 18 each secured to tubes 11, 12 and 13 respectively. In the preferred embodiment, the angle of inclination of each section 16, 17 and 18 is in the order of 28 degrees.

Each of the float tubes has a frustoconical shaped section secured to the aft end thereof and inclined upwardly to reduce pitch poling of the vehicle. In the preferred embodiment, this is shown as sections 22, 23 and 24 secured to tubes 11, 12 and 13 respectively. It is preferred that the angle of inclination of each of the sections 22, 23 and 24 is in the order of 14 degrees.

The float assembly shown in FIGS. 1 and 2 is secured to the left-hand skid means 31 of the helicopter 21 and the outboard float 11 may have two bulkheads 26 and 27 to divide it into three compartments. Similarly, the upper float 12 includes bulkheads 28 and 29 to also divide it into three compartments. The inboard float 13 is broken up into three sections 13a, 13b and 13c, as shown in FIG. 2, to enable the struts 31a and 31b skid means 31 to be passed between the three sections thereof. If any one of the sections 13a, 13b or 13c is damaged to the extent that it becomes deflated, the remaining sections of the float tube 13 as well as those of the undamaged tubes 11 and 12 will provide sufficient buoyancy to maintain the helicopter afloat. In the preferred embodiment, the tubes may be constructed of lightweight high strength, highly abrasive resistant, coated fabrics which have excellent weathering and aging properties. Such fabrics are fungus resistant and not affected by exposure for 72 hours to a number of fluids such as grease, oil, fuel, hydraulic fluid and battery concentrations of potassium hydroxide or sulfuric acid.

Girth means is provided to secure the skid means 31 and 32 to the two tubes in the horizontal plane. In the preferred embodiment, this is shown as girths 33 and 34 as shown in greater detail in FIG. 4. The girths 33 and 34 are formed of a suitable fabric and are secured to the associated float tubes by a suitable adhesive. The three float tube assembly of the present invention causes the adhesive joint between the girth and the float to be loaded in a more nearly true shear direction than prior art loading which is in a peel direction. This is a more desirable loading since adhesive joints develop their maximum strength when loaded in a shear direction.

Each girth 33 and 34 has a U-shaped section 36 and 37, respectively, and may have a solid piece of material, not shown, secured between the two vertical portions of the U-shaped section. A bolt 38 is fitted through the U-shaped sections as well as the horizontal portion 31a of the skid 31 to thereby secure the float assembly 10 to the skid.

Skid 31 and 32 are secured to the bottom of the fuselage of helicopter 21 as shown in FIG. 3 by any suitable and well known means which forms no part of this invention. The positioning of the lower horizontal portions 31c and 32c of the skid means 31 and 32 beneath the intersection of the two floats 11 and 13 provides additional fuselage to landing surface clearance. If the helicopter lands on a water surface, the additional clearance prevents the fuselage from touching the water.

This feature of the invention is particularly important when the helicopter lands in rough seas.

Inflation means may be provided for providing continual inflation of the floats. The inflation means may be either external to the helicopter or installed on the helicopter.

Figure 5:
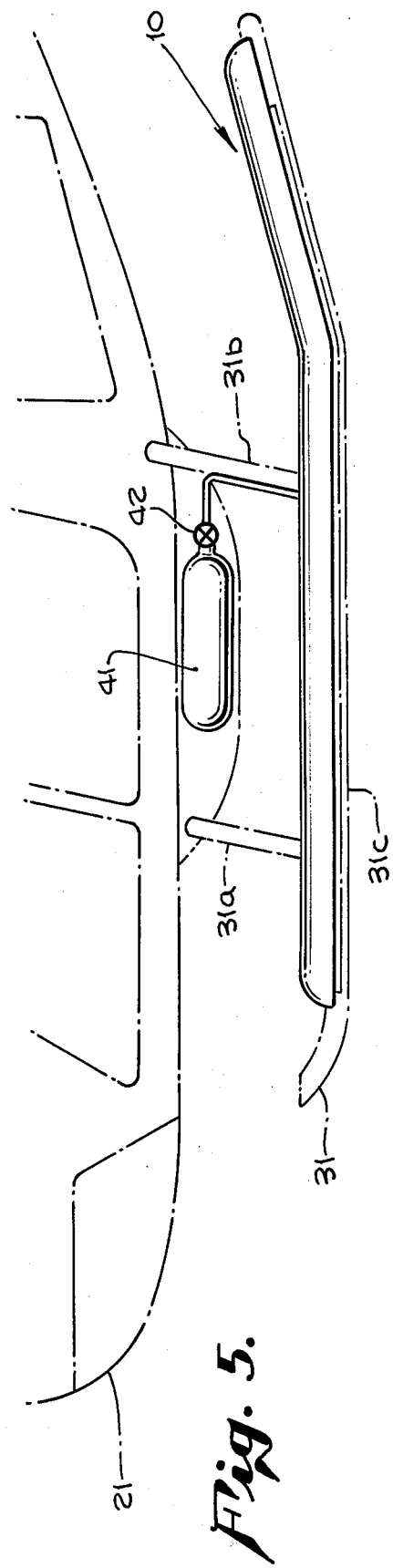
FIG. 5 is a side elevational view of a deflated float assembly of the present invention secured to a helicopter skid.
Figure 6:
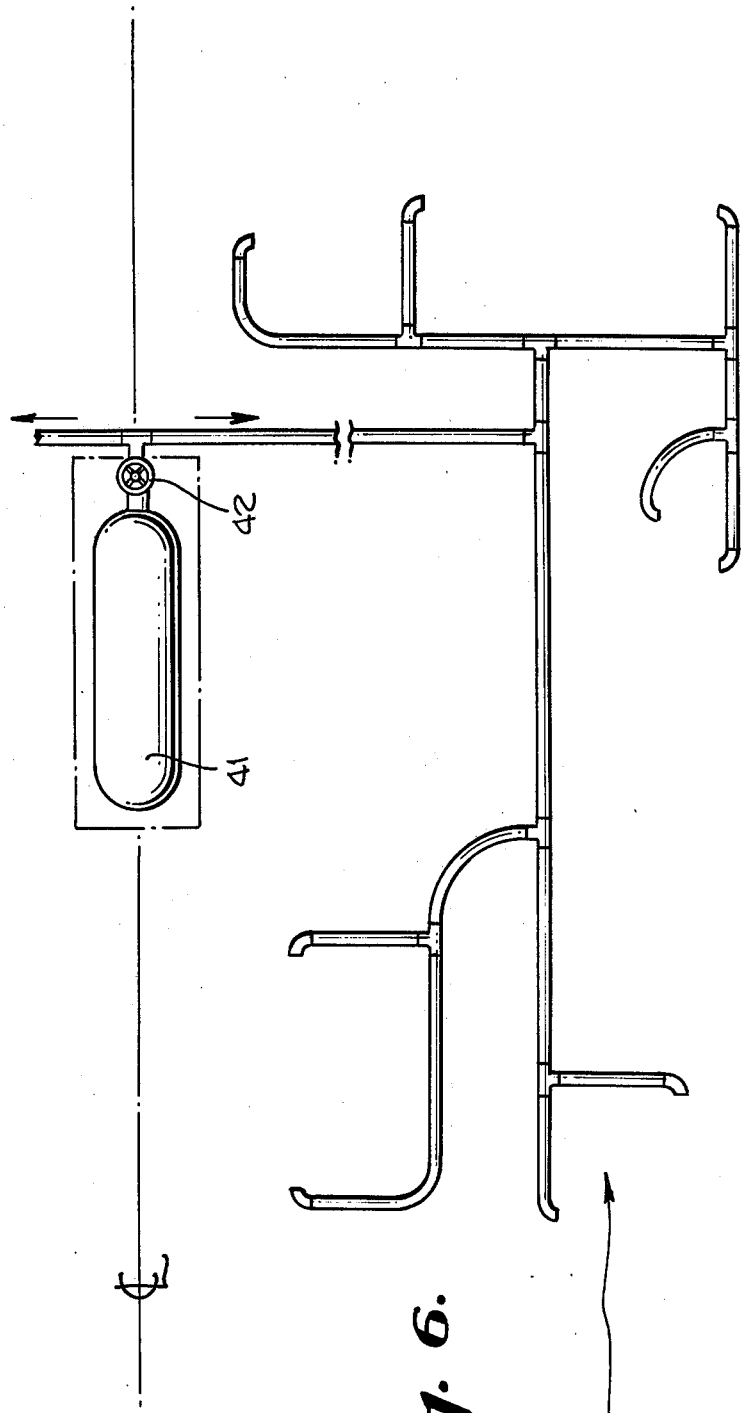
FIG. 6 is a schematic diagram of the inflation system for the float assembly of the present invention.

Inflation means may be provided, for example, as shown in FIGS. 5 and 6, to inflate the various compartments and sections of the float assembly. The assembly 10 in FIG. 5 is shown in the deflated position stored just above the lower horizontal surface 31c of the skid 31. The inflation system includes a reservoir 41 of compressed air which typically has a volume in the order of 900 cubic inches. A valve 42 is provided to open or close the reservoir and is preferably a solenoid energized pilot operated shut off valve. The hose and tube assembly 43 provides air conduits connected to the various sections and compartments of the float tubes for providing inflation of the associated float tubes when the valve 42 is opened. The hoses preferably have a stainless steel braided Teflon inner core construction. The tube assemblies are preferably rigid and have nuts and sleeves at each end. The inflation means may be carried by the vehicle and secured to the float assemblies 10 by well known means which form no part of the present invention.

Obviously, many modifications and variations of the present invention are possible in light of the above teachings. It is therefore to be understood that within the scope of the appended claims, the invention can be practiced otherwise than as specifically described.

I claim:

1. A float assembly for supporting a vehicle having a fuselage comprising:
    at least two float tubes contiguously secured together so that the centerline of the two float tubes are parallel and lie in a horizontal plane;
    a pair of girths, each secured to its own one of said two float tubes;
    skid means connected to the fuselage; and
    means for securing said skid means to each of said girths, said means being positioned near the contiguous surfaces of said two float tubes so that the forces tending to separate the float tubes from each girth are substantially in the shear direction.

2. A float assembly for supporting a vehicle having a fuselage comprising:
    three float tubes secured together so that two of said tubes are positioned such that their centerlines are in a horizontal plane and the third tube is positioned such that its centerline is located substantially directly above the intersection of the first two tubes;
    girths attached to said two bottom float tubes; and
    skids connected to said fuselage, and secured to said girths so that the fuselage is prevented from touching a landing surface.

3. The float assembly as described in claim 2 and wherein each of said float tubes has a frustoconical section secured to the forward end thereof and inclined upwardly to provide a planing bow to thereby increase the maneuverability of said vehicle.

4. The float assembly as described in claim 2 and wherein each of said float tubes has a frustoconical section secured to the aft end thereof and inclined upwardly to reduce pitch poling of the vehicle.

5. The float assembly as described in claim 2 and wherein at least one of said float tubes includes at least one bulkhead to thereby divide said one float tube into a plurality of compartments to thereby enable at least one of said plurality of compartments to provide flotation if another of said plurality of compartments is deflated.

6. The float assembly as described in claim 2 and wherein two of said three float tubes include at least two bulkheads each to thereby divide said two float tubes into at least three compartments to thereby enable two compartments in each of the float tubes to provide flotation if the third compartment of the associated float tube is deflated.

7. The float assembly as described in claim 6 and wherein the centers of said three float tubes form an equilateral triangle and wherein one of said two float tubes having bulkheads is the outboard tube and the second of said two float tubes having bulkheads is the upper tube.

8. The device as described in claim 7 and wherein each of said girths includes a U-shaped portion and further including a bolt fitted through said U-shaped portion and the associated skid.

9. The float assembly as described in claim 2 wherein said skids are attached to said girths at a location along the surface of the float tubes so that the vertical forces that the float tubes exert on the girths are substantially in the shear direction.

10. A float assembly for supporting a vehicle having a fuselage comprising:
    three float tubes secured together wherein two of said tubes are positioned so that their centerlines are in a horizontal plane and said third float tube is positioned substantially directly above the intersection of said two bottom float tubes;
    means for securing said three tubes together tangentially along three planes to form a Y-shaped cross-sectional configuration and the centers of said float tubes substantially define an equilateral triangle;
    skids connected to the fuselage; and
    means located below the intersection of the two bottom float tubes for securing said skids to at least one of said bottom float tubes.

11. The float assembly as described in claim 10 and wherein said three float tubes have cylindrical cross sections except for the portions thereof which form said Y-shaped cross-sectional configuration.

12. The float assembly defined in claim 11 wherein the means for securing said skids to the float tubes includes adhesive means for attaching said securing means to the float tubes at a position on the float tubes such that the vertical forces which the float tubes will exert on said adhesive means will be substantially in the shear direction.

13. A pair of float assemblies for a vehicle having a fuselage and at least one skid associated with each float assembly, wherein each float assembly comprises:
    three float tubes secured together wherein the centerlines of two of said tubes lie in a horizontal plane and the centerline of the third tube is parallel to and directly above the intersection of the first two tubes;
    means for securing said three float tubes together tangentially along three planes to form a Y-shaped cross-sectional configuration; and
    a pair of girths, each secured to its own one of said bottom two float tubes and attached to the associated skid so as to prevent the fuselage from touching the landing surface.

14. The apparatus defined in claim 13 wherein:
the inner one of the two bottom float tubes has two or more open sections; and
further including attachment means for attaching the skids to the vehicle, and wherein said attachment means pass through said open sections.

15. The apparatus defined in claim 13 wherein each skid is attached to its associated girth at a location along the circumference of the float tube so that the vertical forces that the float tubes exert on its associated girth are substantially in the shear direction.

* * * * *